United States Patent
Ahn et al.

(10) Patent No.: US 12,031,441 B2
(45) Date of Patent: *Jul. 9, 2024

(54) MULTI-BEARING SCROLL COMPRESSOR TO ENHANCE LOAD MANAGEMENT

(71) Applicant: Hanon Systems, Daejeon (KR)

(72) Inventors: Hyun Seong Ahn, Daejeon (KR); Chi Myeong Moon, Daejeon (KR); Kweon Soo Lim, Daejeon (KR); Jae Hoon Lim, Daejeon (KR); Soo Cheol Jeong, Daejeon (KR)

(73) Assignee: Hanon Systems, Daejeon (KR)

( * ) Notice: Subject to any disclaimer, the term of this patent is extended or adjusted under 35 U.S.C. 154(b) by 55 days.

This patent is subject to a terminal disclaimer.

(21) Appl. No.: 17/743,802

(22) Filed: May 13, 2022

(65) Prior Publication Data

US 2022/0268277 A1 Aug. 25, 2022

Related U.S. Application Data

(62) Division of application No. 16/326,989, filed as application No. PCT/KR2018/001906 on Feb. 13, 2018, now Pat. No. 11,359,627.

(30) Foreign Application Priority Data

Feb. 15, 2017 (KR) .................. 10-2017-0020530
Feb. 12, 2018 (KR) .................. 10-2018-0016942

(51) Int. Cl.
*F01C 21/02* (2006.01)
*F04C 18/02* (2006.01)
(Continued)

(52) U.S. Cl.
CPC .......... *F01C 21/02* (2013.01); *F04C 18/0215* (2013.01); *F04C 23/008* (2013.01);
(Continued)

(58) Field of Classification Search
CPC .... F01C 21/02; F04C 18/0215; F04C 23/008; F04C 29/00; F04C 29/0021;
(Continued)

(56) References Cited

U.S. PATENT DOCUMENTS 11,359,627 B2 *  6/2022  Ahn .................. F04C 23/008
2004/0247474 A1  12/2004  Kitaura et al.
(Continued)

FOREIGN PATENT DOCUMENTS

CN    101713401 A    5/2010
CN    109690085 A    4/2019
(Continued)

OTHER PUBLICATIONS

English Translation of KR21030057895A (translated via USPTO Fit Database) (Year: 2013).*

*Primary Examiner* — Dominick L Plakkoottam
*Assistant Examiner* — Paul W Thiede
(74) *Attorney, Agent, or Firm* — Norton Rose Fulbright US LLP; James R. Crawford

(57) ABSTRACT

A scroll compressor including a first bearing rotatably supporting a rotary shaft relative to a casing at one side of the rotary shaft with respect to a motor, a second bearing rotatably supporting the rotary shaft relative to the casing at the other side of the rotary shaft with respect to the motor, and a third bearing rotatably supporting the rotary shaft relative to an orbiting scroll at the opposite side of the first bearing with respect to the second bearing. The distance between a first bearing center and a third bearing center is a predetermined distance, the distance between a motor center and the third bearing center is longer than the distance between the motor center and the first bearing center, and the distance between a second bearing center and the motor (Continued)

center is longer than the distance between the second bearing center and the third bearing center.

5 Claims, 2 Drawing Sheets

(51) Int. Cl.
  *F04C 23/00* (2006.01)
  *F04C 29/00* (2006.01)
  *F16C 9/02* (2006.01)

(52) U.S. Cl.
  CPC .......... *F04C 29/00* (2013.01); *F04C 29/0021* (2013.01); *F04C 29/0057* (2013.01); *F04C 2230/602* (2013.01); *F04C 2240/50* (2013.01); *F04C 2240/52* (2013.01); *F04C 2240/56* (2013.01); *F04C 2240/60* (2013.01); *F04C 2240/70* (2013.01); *F16C 9/02* (2013.01)

(58) Field of Classification Search
  CPC ............ F04C 29/0057; F04C 2230/602; F04C 2240/50; F04C 2240/52; F04C 2240/56; F04C 2240/60; F04C 2240/70; F04C 29/0042; F16C 9/02
  See application file for complete search history.

(56) References Cited

U.S. PATENT DOCUMENTS

| | | |
|---|---|---|
| 2005/0207926 A1 | 9/2005 | Nishiwaki et al. |
| 2013/0004355 A1 | 1/2013 | Kiem et al. |
| 2015/0010417 A1 | 1/2015 | Won et al. |

FOREIGN PATENT DOCUMENTS

| | | | |
|---|---|---|---|
| JP | H02199285 A | | 8/1990 |
| JP | 2012189043 A | | 10/2012 |
| KR | 20120042494 A | | 5/2012 |
| KR | 20130057895 A | * | 6/2013 |
| KR | 20140142046 A | | 12/2014 |
| KR | 20150104998 A | | 9/2015 |
| KR | 20160081675 A | | 7/2016 |

* cited by examiner

MULTI-BEARING SCROLL COMPRESSOR TO ENHANCE LOAD MANAGEMENT

This patent application is a division of U.S. patent application Ser. No. 16/326,989 filed Feb. 21, 2019, which is a national phase under 35 U.S.C. § 371 of International Application No. PCT/KR2018/001906 filed Feb. 13, 2018, which claims priority from Korean Patent Application Nos. 10-2017-0020530, filed Feb. 15, 2017, and 10-2018-0016942, filed Feb. 12, 2018, each of which is hereby incorporated herein by reference in its entirety for all purposes.

TECHNICAL FIELD

The present disclosure relates to a scroll compressor, and more particularly, to a scroll compressor that includes a fixed scroll and an orbiting scroll orbiting around the fixed scroll while defining a compression chamber together with the fixed scroll, thereby enabling a refrigerant to be compressed.

BACKGROUND ART

In general, a vehicle is equipped with an air conditioning (A/C) system for cooling/heating the interior thereof. This air conditioning system includes a compressor that is a component of a cooling system and compresses a low-temperature and low-pressure gas-phase refrigerant introduced from an evaporator to a high-temperature and high-pressure gas-phase refrigerant to send it to a condenser.

The compressor applied to a vehicle is typically configured as a mechanical compressor driven by the driving force transmitted from an engine, whereas the compressor applied to, for example, an electric vehicle is also configured as an electric compressor driven by the driving force transmitted from a motor.

Meanwhile, as an example of the compressor, there are a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a rotary shaft installed with a swash plate, and the like, according to the power transmission method from the drive source. The rotary compressor includes a vane rotary compressor that utilizes a rotating rotary shaft and vane, and a scroll compressor that utilizes an orbiting scroll and a fixed scroll.

The scroll compressor has been widely used for refrigerant compression in the air conditioning system or the like since the scroll compressor is advantageous in that it can obtain a relatively higher compression ratio and a more stable torque by smoothly performing the suction, compression, and discharge strokes of refrigerant, compared to other compressors.

Korean Patent Application Publication No. 10-2016-0081675 discloses a conventional scroll compressor that is electrically driven.

Referring to FIG. 1 in Korean Patent Application Publication No. 10-2016-0081675, the conventional scroll compressor includes a motor 3 that generates a driving force in a casing 11, a rotary shaft 4 that is rotated by the motor 3, an orbiting scroll 6 that orbits around the rotary shaft 4, and a fixed scroll 5 that defines a compression chamber together with the orbiting scroll 6.

The conventional scroll compressor includes a first bearing 82 that rotatably supports the rotary shaft 4 relative to the casing 11 at one side of the rotary shaft 4 with respect to the motor 3, a second bearing 81 that rotatably supports the rotary shaft 4 relative to the casing 11 at the other side of the rotary shaft 4 with respect to the motor 3, and a third bearing 83 that rotatably supports the rotary shaft 4 relative to the orbiting scroll 6 at the opposite side of the first bearing 82 with respect to the second bearing 81.

This conventional scroll compressor is problematic in that the second bearing 81 is easily damaged and the operation of the scroll compressor stops.

In the case where the second bearing 81 is configured as a bearing having a higher load capacity than the first and third bearings 82 and 83 to prevent the operation of the scroll compressor from stopping due to the damage of the second bearing 81, there is a problem in that the cost, size, and weight of the scroll compressor are increased.

DISCLOSURE

Technical Problem

Accordingly, an object of the present disclosure is to provide a scroll compressor capable of preventing damage of a bearing that supports a rotary shaft between a motor and an orbiting scroll.

In addition, another object of the present disclosure is to provide a scroll compressor capable of suppressing an increase in cost, size, and weight due to a bearing.

Technical Solution

To accomplish the above objects, in accordance with an aspect of the present disclosure, a scroll compressor includes a casing, a motor to generate a driving force in the casing, a rotary shaft rotated by the motor, an orbiting scroll orbiting around the rotary shaft, a fixed scroll defining a compression chamber together with the orbiting scroll, a first bearing rotatably supporting the rotary shaft relative to the casing at one side of the rotary shaft with respect to the motor, a second bearing rotatably supporting the rotary shaft relative to the casing at the other side of the rotary shaft with respect to the motor, and a third bearing rotatably supporting the rotary shaft relative to the orbiting scroll at an opposite side of the first bearing with respect to the second bearing, wherein assuming that the center of the first bearing is a first bearing center, the center of the second bearing is a second bearing center, the center of the third bearing is a third bearing center, and the center of a rotor of the motor is a motor center, in an extension direction of the rotary shaft, a distance between the first bearing center and the third bearing center is a predetermined distance, a distance between the motor center and the third bearing center is longer than a distance between the motor center and the first bearing center, and a distance between the second bearing center and the motor center is longer than a distance between the second bearing center and the third bearing center.

The distance between the motor center and the third bearing center may be 1.9 times greater than the distance between the motor center and the first bearing center.

The distance between the second bearing center and the motor center may range from 1.17 times to 1.22 times greater than the distance between the motor center and the first bearing center.

The distance between the second bearing center and the motor center may be 1.22 times greater than the distance between the motor center and the first bearing center.

The second bearing may have the same load capacity as at least one of the first and third bearings.

In accordance with another aspect of the present disclosure, a scroll compressor includes a casing, a motor to generate a driving force in the casing, a rotary shaft rotated by the motor, an orbiting scroll orbiting around the rotary shaft, a fixed scroll defining a compression chamber together with the orbiting scroll, a first bearing rotatably supporting the rotary shaft relative to the casing at one side of the rotary shaft with respect to the motor, a second bearing rotatably supporting the rotary shaft relative to the casing at the other side of the rotary shaft with respect to the motor, and a third bearing rotatably supporting the rotary shaft relative to the orbiting scroll at an opposite side of the first bearing with respect to the second bearing, wherein assuming that the center of the first bearing is a first bearing center, the center of the second bearing is a second bearing center, and the center of the third bearing is a third bearing center, in an extension direction of the rotary shaft, a distance between the second bearing center and the third bearing center is shorter than a distance between the second bearing center and the first bearing center.

The distance between the second bearing center and the first bearing center may range from 2.97 times to 3.27 times greater than the distance between the second bearing center and the third bearing center.

Assuming that the center of a rotor of the motor is a motor center, the distance between the second bearing center and the third bearing center may be shorter than a distance between the second bearing center and the motor center.

The distance between the second bearing center and the motor center may range from 1.60 times to 1.80 times greater than the distance between the second bearing center and the third bearing center.

A distance between the motor center and the third bearing center may be longer than a distance between the motor center and the first bearing center.

The distance between the motor center and the third bearing center may be 1.9 times greater than the distance between the motor center and the first bearing center.

A distance between the first bearing center and the third bearing center may be a predetermined distance.

In accordance with still another aspect of the present disclosure, a scroll compressor includes a casing, a motor to generate a driving force in the casing, a rotary shaft rotated by the motor, an orbiting scroll orbiting around the rotary shaft, a fixed scroll defining a compression chamber together with the orbiting scroll, and a second bearing rotatably supporting the rotary shaft between the motor and the compression chamber, wherein the rotary shaft includes an eccentric bush rotating at an overlapped position with the second bearing in an axial direction of the rotary shaft, and the second bearing is adjacent as close as possible to the compression chamber within a range in which it does not interfere with the eccentric bush.

In accordance with a further aspect of the present disclosure, a scroll compressor includes a casing, a motor to generate a driving force in the casing, a rotary shaft rotated by the motor, an orbiting scroll orbiting around the rotary shaft, and a fixed scroll defining a compression chamber together with the orbiting scroll, wherein the casing includes a first partition wall to separate a space for accommodation of the motor from a space for accommodation of an inverter to control the motor, and a second partition wall to separate the space for accommodation of the motor from a space for provision of the compression chamber, the first partition wall is formed with a first support groove into which a first bearing to support one end of the rotary shaft is inserted, the second partition wall is formed with a second support groove into which a second bearing to support the other end of the rotary shaft is inserted, and the second support groove is recessed from a surface of the second partition wall 113 facing the compression chamber.

The second bearing may be formed as low as possible within a range in which it does not protrude in an axial direction from the second support groove.

Advantageous Effects

A scroll compressor according to the present disclosure includes a first bearing rotatably supporting a rotary shaft relative to a casing at one side of the rotary shaft with respect to a motor, a second bearing rotatably supporting the rotary shaft relative to the casing at the other side of the rotary shaft with respect to the motor, and a third bearing rotatably supporting the rotary shaft relative to an orbiting scroll at the opposite side of the first bearing with respect to the second bearing, wherein the distance between a first bearing center and a third bearing center can be a predetermined distance, the distance between a motor center and the third bearing center can be longer than the distance between the motor center and the first bearing center, and the distance between a second bearing center and the motor center can be longer than the distance between the second bearing center and the third bearing center. Thus, it is possible to prevent the damage of the second bearing under poor load conditions.

In addition, the second bearing can have the same load capacity as at least one of the first and third bearings. Thus, it is possible to suppress an increase in cost, size, and weight due to the bearing.

BEST MODE FOR INVENTION

Hereinafter, a scroll compressor according to exemplary embodiments of the present disclosure will be described in detail with reference to the accompanying drawings.

Figure 1:
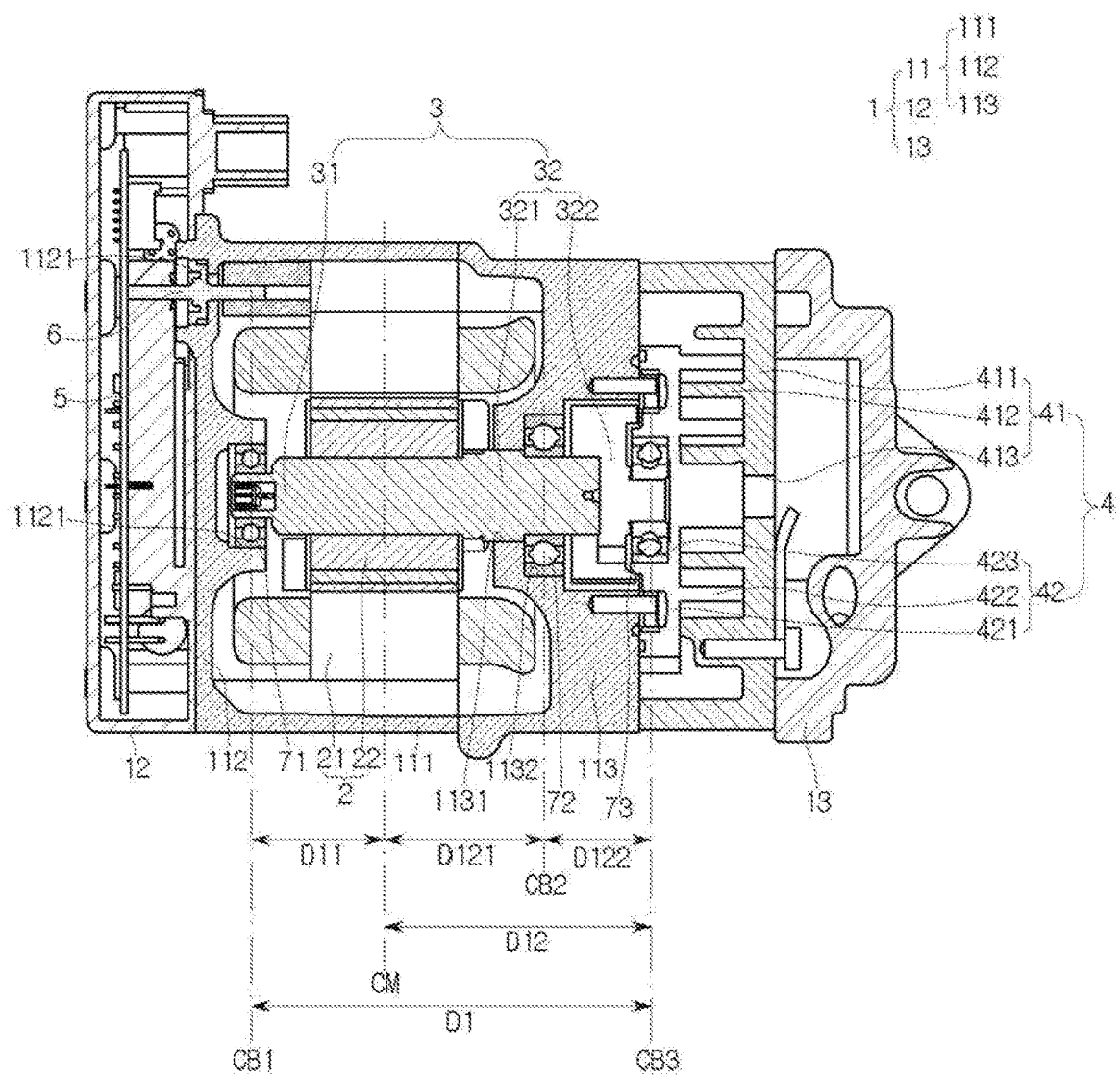
FIG. 1 is a cross-sectional view illustrating a scroll compressor according to an embodiment of the present disclosure.
Figure 2:
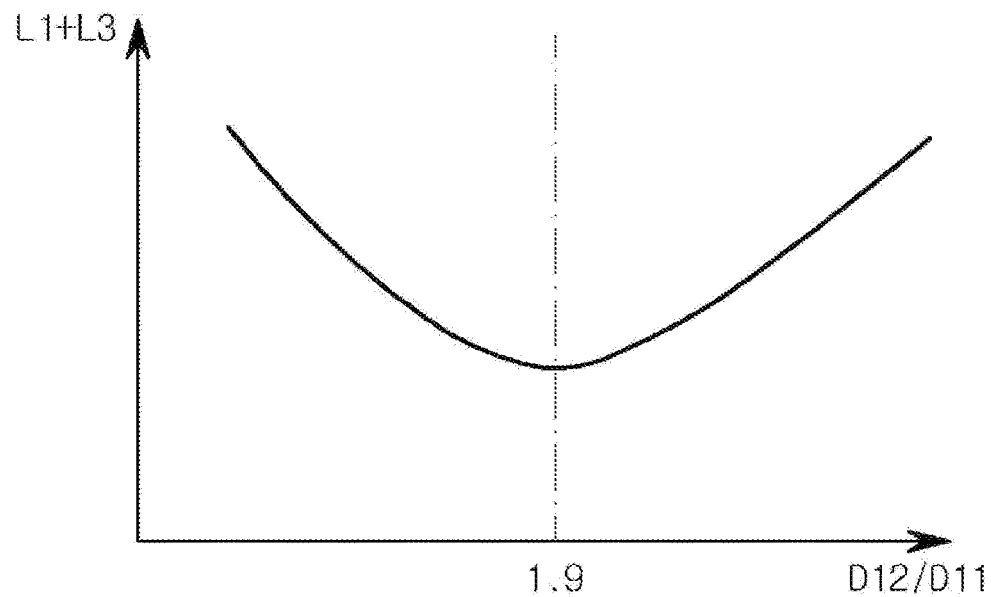
FIG. 2 is a graph illustrating loads applied to first and third bearings according to the distance between a motor center and a first bearing center and the distance between the motor center and a third bearing center in the scroll compressor of FIG. 1.
Figure 3:
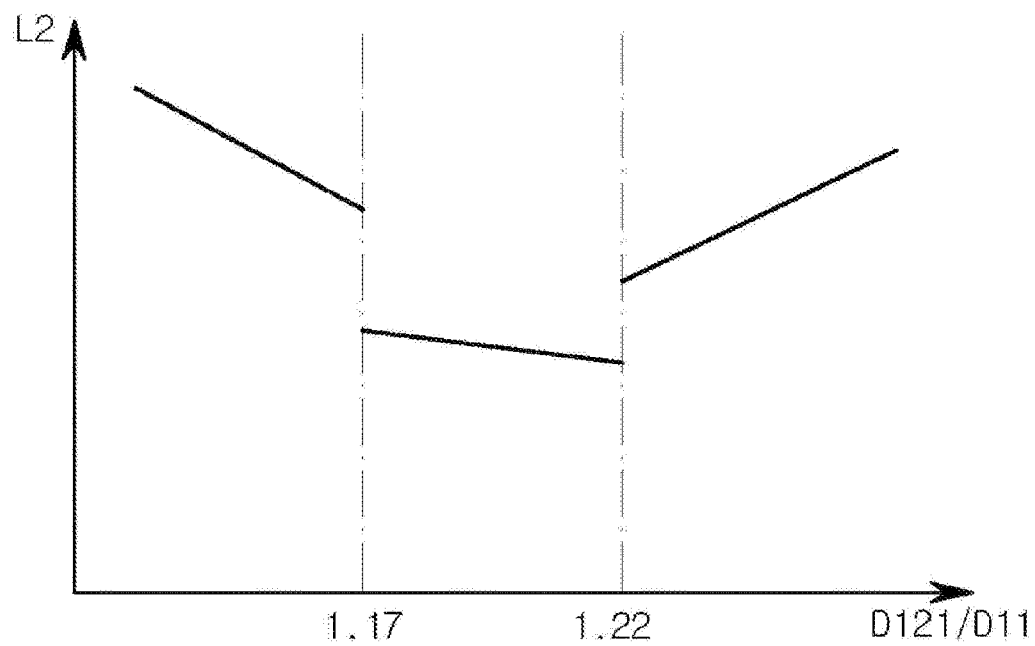
FIG. 3 is a graph illustrating a load applied to a second bearing according to the distance between a second bearing center and the motor center and the distance between the motor center and the third bearing center in the scroll compressor of FIG. 1.

FIG. 1 is a cross-sectional view illustrating a scroll compressor according to an embodiment of the present disclosure. FIG. 2 is a graph illustrating loads applied to first and third bearings according to the distance between a motor center and a first bearing center and the distance between the motor center and a third bearing center in the scroll compressor of FIG. 1. FIG. 3 is a graph illustrating a load applied to a second bearing according to the distance between a second bearing center and the motor center and the distance between the motor center and the third bearing center in the scroll compressor of FIG. 1.

Referring to FIGS. 1 to 3, the scroll compressor according to the embodiment of the present disclosure may include a casing 1, a motor 2 that generates a driving force in the casing 1, a rotary shaft 3 that is rotated by the motor 2, and a compression mechanism 4 that is driven by the rotary shaft 3 to compress a refrigerant.

The casing 1 may include a first housing 11 that accommodates the motor 2 therein, a second housing 12 that accommodates an inverter 5 for controlling the motor 2, and a third housing 13 that accommodates the compression mechanism 4.

The first housing 11 may include an annular wall 111, a first partition wall 112 covering one end of the annular wall 111, and a second partition wall 113 covering the other end of the annular wall 111. The annular wall 111 and the first and second partition walls 112 and 113 may define a motor accommodation space in which the motor 2 is accommodated.

The second housing 12 may be coupled to the first partition wall 112 to define an inverter accommodation space in which the inverter 5 is accommodated.

The first partition wall 112 may separate the motor accommodation space from the inverter accommodation space, and may have a connector hole 1121 formed at one side thereof such that a connector 6 connecting the inverter 5 to the motor 2 passes through the connector hole 1121.

The third housing 13 may be coupled to the second partition wall 113 to define a compression space in which the compression mechanism 4 is accommodated.

The second partition wall 113 may separate the motor accommodation space from the compression space, and may serve as a main frame that supports the compression mechanism 4. The second partition wall 113 may have a bearing hole 1131 formed at the center thereof such that the rotary shaft 3 for operatively connecting the motor 2 to the compression mechanism 4 passes through the bearing hole 1131.

In the present embodiment, the compression mechanism 4 may include a fixed scroll 41, which will be described later, fastened to the second partition wall 113, and the third housing 13 may be fastened to the fixed scroll 41. However, the present disclosure is not limited thereto, and the third housing 13 may also be fastened to the second partition wall 113 while accommodating the compression mechanism 4.

The motor 2 may include a stator 21 that is fixed in the first housing 11, and a rotor 22 that is rotated by interaction with the stator 21 inside the stator 21.

The rotary shaft 3 may pass through the center of the rotor 22 so that one end 31 of the rotary shaft 3 protrudes toward the first partition wall 112 from the rotor 22 and the other end 32 thereof protrudes toward the second partition wall 113 from the rotor 22.

The rotary shaft 3 may be rotatably supported at one end 31 thereof by a first bearing 71 provided at the center of the first partition wall 112.

The first partition wall 112 may have a first support groove 1122 formed at the center thereof such that the first bearing 71 and one end 31 of the rotary shaft 3 are inserted into the first support groove 1122. The first bearing 71 may be interposed between the first support groove 1122 and one end 31 of the rotary shaft 3.

The other end 32 of the rotary shaft 3 may be connected to the compression mechanism 4 through the bearing hole 1131 of the second partition wall 113.

When the other end 32 of the rotary shaft 3 consists of a first portion 321 supported by the second partition wall 113 and a second portion (eccentric bush) 322 connected to the compression mechanism 4, the first portion 321 may be rotatably supported by a second bearing 72 provided in the bearing hole 1131 of the second partition wall 113, and the second portion (eccentric bush) 322 may be rotatably supported by a third bearing 73 provided in the compression mechanism 4.

The bearing hole 1131 of the second partition wall 113 may be formed with a second support groove 1132 into which the second bearing 72 and the first portion 321 of the other end 32 of the rotary shaft 3 are inserted, and the second bearing 72 may be interposed between the second support groove 1132 and the first portion 321 of the other end 32 of the rotary shaft 3.

The compression mechanism 4 may include an orbiting scroll 42, which will be described later, having a boss 423 into which the third bearing 73 and the second portion (eccentric bush) 322 of the other end 32 of the rotary shaft 3 are inserted, and the third bearing 73 may be interposed between the boss 423 and the second portion (eccentric bush) 322 of the other end 32 of the rotary shaft 3.

The fixed scroll 41 included in the compression mechanism 4 may be fixedly coupled to the second partition wall 113 at the opposite side of the motor 2, and the orbiting scroll 42 included in the compression mechanism 4 may be engaged to the fixed scroll 41 between the second partition wall 113 and the fixed scroll 41 to define two pairs of compression chambers and orbit around the rotary shaft 3.

The fixed scroll 41 may include a fixed end plate 411 having a disk shape, and a fixed wrap 412 that protrudes from a compressed surface of the fixed end plate 411 to engage with an orbiting wrap 422, which will be described later, of the orbiting scroll 42.

The fixed end plate 411 may have a discharge port 413 formed at the center thereof such that the refrigerant compressed in the compression chambers is discharged from the discharge port 413 through the fixed end plate 411. The discharge port 413 may communicate with a discharge space defined between the fixed scroll 41 and the third housing 13.

The orbiting scroll 42 may include an orbiting end plate 421 having a disk shape, and an orbiting wrap 422 that protrudes from a compressed surface of the orbiting end plate 421 to engage with the fixed wrap 412 and define the compression chambers.

The orbiting end plate 421 may be formed with the boss 423 protruding opposite the orbiting wrap 422 for insertion of the rotary shaft 3 thereinto.

In the scroll compressor according to the present embodiment having such a configuration, when electric power is applied to the motor 2, the rotary shaft 3 may transmit a rotational force to the orbiting scroll 42 while rotating together with the rotor 22. The orbiting scroll 42 orbits around the second portion (eccentric bush) 322 of the rotary shaft 3, thereby enabling the compression chambers to be reduced in volume while continuing to move toward the centers thereof. In this case, a refrigerant may be introduced into the motor accommodation space through a refrigerant inlet (not shown) formed in the annular wall 111 of the first housing 11. The refrigerant in the motor accommodation space may be sucked into the compression chambers through a refrigerant through-hole (not shown) formed in the second partition wall 113 of the first housing 11. The refrigerant sucked into the compression chambers may be compressed while flowing to the centers of the compression chambers along the flow paths thereof and may be discharged to the discharge space through the discharge port 413. The refrigerant introduced into the discharge space may be discharged out of the scroll compressor through a refrigerant outlet formed in the third housing 13. This series of processes is repeated.

In these processes, the rotary shaft 3 may be rotatably supported by the first, second, and third bearings 71, 72, and 73. Since the load applied to the second bearing 72 is significantly greater than those applied to the first and third bearings 71 and 73, the second bearing 72 may be easily damaged.

To prevent the damage of the second bearing 72, the second bearing 72 may be configured as a bearing having a higher load capacity than the first and third bearings 71 and 73, in which case however the cost, size, and weight of the second bearing 72 are increased. Eventually, the overall cost, size, and weight of the scroll compressor may be increased.

Considering this point, the second bearing 72 may be formed at a predetermined position to prevent the damage of the second bearing 72 by reducing the load applied thereto in the present embodiment.

In detail, the load applied to the second bearing 72 is a load applied to the second bearing 72 by the rotary shaft 3, and is closely associated with a rotational force applied to the rotary shaft 3, a reaction force applied to the rotary shaft 3 in the process of compressing a refrigerant by the compression mechanism 4, and a positional relationship between a point of application of the rotational force, a point of application of the reaction force, and a point of support of the rotary shaft 3.

Thus, to reduce the load applied to the second bearing 72, it is necessary to reduce the rotational force and the reaction force, or adjust the positional relationship between the point of application of the rotational force, the point of application of the reaction force, and the point of support of the rotary shaft 3.

However, reducing the rotational force and the reaction force is not preferable since compression performance is deteriorated. Considering this point, it is possible to reduce the load applied to the second bearing 72 by adjusting the positional relationship between the point of application of the rotational force, the point of application of the reaction force, and the point of support of the rotary shaft 3 in the present embodiment.

In more detail, assuming that the center of the first bearing 71 is a first bearing center CB1, the center of the second bearing 72 is a second bearing center CB2, the center of the third bearing 73 is a third bearing center CB3, and the center of the rotor 22 of the motor 2 is a motor center CM in the extension direction of the rotary shaft 3 (in the horizontal direction of FIG. 1), the motor center CM may be a point of application of the rotational force, the third bearing center CB3 may be a point of application of the reaction force, and the first bearing center CB1 and the second bearing center CB2 may be points of support of the rotary shaft 3.

The first bearing center CB1 and the third bearing center CB3 may be formed such that the distance between the first bearing center CB1 and the third bearing center CB3 (hereinafter, referred to as a "first distance") D1 is a predetermined distance such that the length of the scroll compressor (the horizontal length of FIG. 1) is not greater than a predetermined value. Here, the distance is a distance measured in the extension direction of the rotary shaft 3 (in the horizontal direction of FIG. 1).

The motor center CM may be formed such that the distance between the motor center CM and the third bearing center CB3 (hereinafter, referred to as a "1-2 distance") D12 is longer than the distance between the motor center CM and the first bearing center CB1 (hereinafter, referred to as a "1-1 distance") D11, to obtain the maximum performance of the motor 2 in the motor accommodation space in which the motor 2 is limited. That is, the motor 2 must be formed so as not to interfere with the first and second partition walls 112 and 113, and the motor center CM is preferably positioned in the middle between the first partition wall 112 and the second partition wall 113 to obtain the maximum performance (size) of the motor 2 while satisfying this limitation, in which case the 1-2 distance D12 may be longer than the 1-1 distance D11.

The motor center CM is a point of application of the rotational force, and the loads applied to the first and third bearings 71 and 73 are changed depending on where the motor center CM is positioned in the extension direction of the rotary shaft 3. According to the result of an experiment, the motor center CM may be preferably formed such that the 1-2 distance D12 is 1.9 times greater than the 1-1 distance D11 to minimize the sum of loads L1+L3 applied to the first and third bearings 71 and 73, as illustrated in FIG. 2.

The second bearing center CB2 may be formed such that the distance between the second bearing center CB2 and the motor center CM (hereinafter, referred to as a "1-2-1 distance") D121 is longer than the distance between the second bearing center CB2 and the third bearing center CB3 (hereinafter, referred to as a "1-2-2 distance") D122 to reduce the load applied to the second bearing 72 in the state in which the third bearing 73 and the motor center CM are formed as described above.

That is, the second bearing center CB2 is a portion to which a load for the rotational force (hereinafter, referred to as a "first load") and a load for the reaction force (hereinafter, referred to as a "second load") are simultaneously applied. The first load may be proportional to the strength of the rotational force and the 1-2-1 distance D121, and the second load may be proportional to the strength of the reaction force and the 1-2-2 distance D122. Thus, as the second bearing center CB2 moves closer to the first bearing 71, the 1-2-1 distance D121 may be reduced to reduce the first load whereas the 1-2-2 distance D122 may be increased to increase the second load. On the other hand, as the second bearing center CB2 moves closer to the third bearing 73, the 1-2-2 distance D122 may be reduced to reduce the second load whereas the 1-2-1 distance D121 may be increased to increase the first load. However, the total load applied to the second bearing 72 is more significantly affected by the 1-2-2 distance D122 rather than the 1-2-1 distance D121 because the reaction force is greater than the rotational force. Therefore, when the 1-2-1 distance D121 is longer than the 1-2-2 distance D122, it is possible to reduce the total load applied to the second bearing 72.

Meanwhile, it is seen that when the ratio of the 1-2-1 distance D121 in the 1-2 distance D12 is out of a predetermined range (when the 1-2-1 distance D121 is excessively longer than the 1-2-2 distance D122), the total load applied to the second bearing 72 is rather increased. That is, according to the result of an experiment, it is seen that, in the total load L2 applied to the second bearing 72, the ratio of the 1-2-1 distance D121 in the 1-2 distance D12 is gradually reduced at 0.62 (=1.17/1.9) or less, is reduced at 0.62 in a stepped form, is gradually reduced at more than 0.62 and 0.64 (=1.22/1.9) or less, and is again increased at more than 0.64, illustrated in FIG. 3. Thus, it may be preferable that the second bearing center CB2 is formed such that the ratio of the 1-2-1 distance D121 in the 1-2 distance D12 ranges from 0.62 to 0.64 to remarkably reduce the total load L2 applied to the second bearing 72 and such that the ratio of the 1-2-1 distance D121 in the 1-2 distance D12 is 0.64 to minimize the total load L2 applied to the second bearing 72. That is, it may be more preferable that the second bearing center CB2 is formed such that the 1-2-1 distance D121 ranges from 1.17 times to 1.22 times greater than the 1-1 distance D11 and such that the 1-2-1 distance D121 is 1.22 times greater than the 1-1 distance D11.

According to which the scroll compressor according to the embodiment of the present disclosure is configured such that the first distance D1 is a predetermined distance, the 1-2 distance D12 is longer than the 1-1 distance D11, and the 1-2-1 distance D121 is longer than the 1-2-2 distance D122, it is possible to obtain the maximum performance of the motor 2, minimize the loads applied to the first and third bearings 71 and 73, and reduce the load applied to the second bearing 72 to prevent the damage of the second bearing 72, in the predetermined total length of the scroll compressor.

Therefore, in the case where the second bearing 72 is used as a bearing having the same conventional load capacity, it is possible to generally enhance the reliability of the second bearing 72 and the scroll compressor.

Meanwhile, the second bearing 72 may be replaced with a bearing having a smaller load capacity compared to the related art. That is, the second bearing 72 may be formed as a bearing having the same load capacity as at least one of the first and third bearings 71 and 73. Consequently, it is possible to suppress an increase in cost, size, and weight due to the bearing. However, in consideration of safety, it may be preferable that the second bearing 72 has a larger load capacity than the first and third bearings 71 and 73 even though the load capacity thereof is smaller compared to the related art.

The 1-2-1 distance D121 is longer than the 1-2-2 distance D122 on the premise that the first distance D1 is the predetermined distance and the 1-2 distance D12 is longer than the 1-1 distance D11 in the above embodiment, but the present disclosure is not limited thereto.

For example, it is possible to reduce the load applied to the second bearing 72 as long as the 1-2-2 distance D122 is shorter than the sum of the 1-1 distance D11 and the 1-2-1 distance D121. However, in this case, to further reduce the load applied to the second bearing 72, it may be preferable that the sum of the 1-1 distance D11 and the 1-2-1 distance D121 ranges from 2.97 times (=(1+1.17)/(1.9−1.17)) to 3.27 times (=(1+1.22)/(1.9−1.22)) greater than the 1-2-2 distance D122.

Alternatively, it is possible to reduce the load applied to the second bearing 72 as long as the 1-2-2 distance D122 is shorter than the 1-2-1 distance D121. However, in this case, it may be preferable that the 1-2-1 distance D121 ranges from 1.60 times (=1.17/(1.9−1.17)) to 1.80 times (=1.22/(1.9−1.22)) greater than the 1-2-2 distance D122.

Alternatively, it is possible to reduce the load applied to the second bearing 72 as long as the second bearing 72 is adjacent to the compression chambers without considering the distance relationship between the second bearing 72 and the third bearing 73. However, in this case, the second portion (eccentric bush) 322, which rotates at the overlapped position with the second bearing 72, may interfere with the second bearing 72 in the axial direction of the rotary shaft 3. Therefore, to prevent this point, the second bearing 72 needs to be adjacent as close as possible to the compression chambers within a range in which it does not interfere with the second portion (eccentric bush) 322. To this end, the second support groove 1132 may be recessed from the surface of the second partition wall 113 facing the compression chambers and the second bearing 72 may be formed as low as possible within a range in which it does not protrude to the second portion (eccentric bush) 322 (in the axial direction) from the second support groove 1132.

INDUSTRIAL APPLICABILITY

The present disclosure provides a scroll compressor capable of preventing damage of a bearing that supports a rotary shaft between a motor and an orbiting scroll.

In addition, the present disclosure provides a scroll compressor capable of suppressing an increase in cost, size, and weight due to a bearing.

What is claimed is:

1. A scroll compressor comprising:
a casing;
a motor to generate a driving force in the casing;
a rotary shaft rotated by the motor;
an orbiting scroll orbiting around the rotary shaft;
a fixed scroll defining a compression chamber together with the orbiting scroll;
a first bearing rotatably supporting the rotary shaft relative to the casing at one side of the rotary shaft with respect to the motor;
a second bearing rotatably supporting the rotary shaft relative to the casing at the other side of the rotary shaft with respect to the motor; and
a third bearing rotatably supporting the rotary shaft relative to the orbiting scroll at an opposite side of the first bearing with respect to the second bearing,
wherein the center of the first bearing is a first bearing center, the center of the second bearing is a second bearing center, and the center of the third bearing is a third bearing center, in an extension direction of the rotary shaft, a distance between the second bearing center and the first bearing center ranges from 2.97 times to 3.27 times greater than a distance between the second bearing center and the third bearing center.

2. The scroll compressor according to claim 1, wherein:
a first partition wall is formed with a first support groove into which the first bearing to support one end of the rotary shaft is inserted;
a second partition wall is formed with a second support groove into which the second bearing to support the other end of the rotary shaft is inserted; and
the second support groove is recessed from a surface of a second partition wall facing the compression chamber.

3. The scroll compressor according to claim 2, wherein the second support groove is formed so that the second bearing does not protrude from the second support groove in an axial direction which is the extension direction of the rotary shaft.

4. A scroll compressor comprising:
a casing;
a motor to generate a driving force in the casing;
a rotary shaft rotated by the motor;
an orbiting scroll orbiting around the rotary shaft;
a fixed scroll defining a compression chamber together with the orbiting scroll;
a first bearing rotatably supporting the rotary shaft relative to the casing at one side of the rotary shaft with respect to the motor;
a second bearing rotatably supporting the rotary shaft relative to the casing at the other side of the rotary shaft with respect to the motor; and a third bearing rotatably supporting the rotary shaft relative to the orbiting scroll at an opposite side of the first bearing with respect to the second bearing, wherein the center of the first bearing is a first bearing center, the center of the second bearing is a second bearing center, and the center of the third bearing is a third bearing center, in an extension direction of the rotary shaft, a distance between the second bearing center and the third bearing center is shorter than a distance between the second bearing center and the first bearing center, and wherein, the center of a rotor of the motor is a motor center, a distance between the second bearing center and the motor center ranges from 1.60 times to 1.80 times greater than the distance between the second bearing center and the third bearing center.

5. A scroll compressor comprising:

a casing;

a motor to generate a driving force in the casing;

a rotary shaft rotated by the motor;

an orbiting scroll orbiting around the rotary shaft;

a fixed scroll defining a compression chamber together with the orbiting scroll;

a first bearing rotatably supporting the rotary shaft relative to the casing at one side of the rotary shaft with respect to the motor;

a second bearing rotatably supporting the rotary shaft relative to the casing at the other side of the rotary shaft with respect to the motor; and a third bearing rotatably supporting the rotary shaft relative to the orbiting scroll at an opposite side of the first bearing with respect to the second bearing, wherein the center of the first bearing is a first bearing center, the center of the second bearing is a second bearing center, and the center of the third bearing is a third bearing center, in an extension direction of the rotary shaft, a distance between the second bearing center and the third bearing center is shorter than a distance between the second bearing center and the first bearing center, and wherein the center of a rotor of the motor is a motor center, a distance between the motor center and the third bearing center is 1.9 times greater than a distance between the motor center and the first bearing center.

* * * * *